(12) United States Patent
Ramia

(10) Patent No.: US 7,174,427 B2
(45) Date of Patent: Feb. 6, 2007

(54) DEVICE AND METHOD FOR HANDLING MPLS LABELS

(75) Inventor: Kannan Babu Ramia, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 460 days.

(21) Appl. No.: 10/728,639

(22) Filed: Dec. 5, 2003

(65) Prior Publication Data

US 2005/0125490 A1 Jun. 9, 2005

(51) Int. Cl.
G06F 12/00 (2006.01)
(52) U.S. Cl. ...................................... 711/132
(58) Field of Classification Search .................. 711/132
See application file for complete search history.

(56) References Cited

U.S. PATENT DOCUMENTS

| | | | |
|---|---|---|---|
| 6,925,081 B2 * | 8/2005 | Meda | 370/392 |
| 2002/0003797 A1 | 1/2002 | Rautenberg | |
| 2002/0060985 A1 | 5/2002 | Lee et al. | |
| 2003/0002444 A1 | 1/2003 | Shin et al. | |
| 2003/0053464 A1 | 3/2003 | Chen et al. | |
| 2003/0065815 A1 | 4/2003 | Klink | |
| 2003/0099235 A1 | 5/2003 | Shin et al. | |
| 2003/0137983 A1 | 7/2003 | Song | |
| 2003/0152024 A1 | 8/2003 | Yang et al. | |
| 2003/0156541 A1 | 8/2003 | Haihong | |
| 2003/0174706 A1 | 9/2003 | Shankar et al. | |

OTHER PUBLICATIONS

IETF RFC 2702, "Requirements for Traffic Engineering Over MPLS", Sep. 1999, 1-28 pgs.
IETF RFC 3031, "Multiprotocol Label Switching Architecture", Jan. 2001, 1-57 pgs.
IEFT RFC 3036, "LDP Specification", Network Working Group, Jan. 2001, 1-124 pgs.

* cited by examiner

Primary Examiner—Jack A. Lane
(74) Attorney, Agent, or Firm—Blakely, Sokoloff, Taylor & Zafman LLP

(57) ABSTRACT

A device and method for handling Multiprotocol Label Switching (MPLS) label stacks. An incoming label mapping (ILM) table is stored in a first memory. A received packet's label stack is accessed, and an entry corresponding to a top label of the stack is read from the ILM table. A number of other entries are also read from the ILM table, and these other entries are cached in a second memory.

48 Claims, 10 Drawing Sheets

FIG. 3B

FTN TABLE (301a)

| ADDRESS | NHLFE INDEX |
|---|---|
| ADD 1 | 0 |
| ADD 2 | 1 |
| ⋮ | ⋮ |

NHLFE TABLE (301b)

| OUT LABEL | OUT PORT | ACTION |
|---|---|---|
| L0 | 0 | PUSH |
| L4/L1 | 1 | PUSH |
| ⋮ | ⋮ | ⋮ |

FIG. 3C

ILM TABLE (302a)

| IN LABEL | ACTION | NHLFE INDEX |
|---|---|---|
| L0 | POP | --- |
| L4 | SWAP | 1 |
| ⋮ | ⋮ | ⋮ |

NHLFE TABLE (302b)

| OUT LABEL | OUT PORT | ACTION |
|---|---|---|
| --- | 0 | --- |
| L5/L2 | 1 | PUSH |
| ⋮ | ⋮ | ⋮ |

FIG. 3D

ILM TABLE (303a)

| IN LABEL | ACTION | NHLFE INDEX |
|---|---|---|
| --- | --- | --- |
| L5 | SWAP | 1 |
| ⋮ | ⋮ | ⋮ |

NHLFE TABLE (303b)

| OUT LABEL | OUT PORT | ACTION |
|---|---|---|
| --- | 0 | --- |
| L3 | 1 | PUSH |
| ⋮ | ⋮ | ⋮ |

FIG. 3E

ILM TABLE (304a)

| IN LABEL | ACTION | NHLFE INDEX |
|---|---|---|
| --- | --- | --- |
| L3 | POP | --- |
| L2 | POP | --- |
| L1 | POP | --- |
| ⋮ | ⋮ | ⋮ |

NHLFE TABLE (304b)

| OUT LABEL | OUT PORT | ACTION |
|---|---|---|
| --- | 0 | --- |
| --- | 1 | --- |
| ⋮ | ⋮ | ⋮ |

DEVICE AND METHOD FOR HANDLING MPLS LABELS

FIELD OF THE INVENTION

The disclosed embodiments relate generally to networking and, more particularly, to an apparatus and method for handling labels at an egress node of an MPLS network.

BACKGROUND OF THE INVENTION

Multiprotocol Label Switching (MPLS) is a networking protocol in which network nodes forward packets based upon labels. MPLS can integrate Layer 2 and Layer 3 routing and, as such, this protocol can form the bridge from connectionless IP (Internet Protocol) networks to connection-oriented networks, such as ATM (Asynchronous Transfer Mode) networks, frame relay networks, and optical networks (e.g., a Synchronous Optical Network, or SONET). By forming a bridge between IP and Layer 2 technologies such as ATM, MPLS enables the creation of hybrid IP and ATM (or frame relay) networks. Thus, MPLS makes available to the network layer (e.g., the IP layer) many capabilities (e.g., Quality of Service, or QoS, and traffic management) that traditionally existed at Layer 2.

The MPLS protocol is defined by a family of specifications promulgated by the Internet Engineering Task Force (IETF) and available at "http://www.ietf.org/". Specifications defining the MPLS protocol include, for example, IETF Request for Comments (RFC) 3031, *Multiprotocol Label Switching Architecture* (2001), and IETF RFC 2702, *Requirements for Traffic Engineering Over MPLS* (1999). It should be understood, however, that the above-listed documents are but a few examples of specifications relating to MPLS and, further, that other aspects of MPLS may be described in other specifications.

MPLS provides the ability to build virtual circuits across a network using one or more of the aforementioned labels. A virtual circuit through an MPLS network comprises a series of nodes, including an ingress node, one or more intermediate nodes, and an egress node. The nodes at the edges of the MPLS network—i.e., the ingress and egress nodes—are referred to as Label Edge Routers (or LERs), whereas the intermediate nodes are referred to as Label Switching Routers (or LSRs). The LERs couple the MPLS network with other, external networks, whereas the LSRs form the core of the MPLS network.

An MPLS label comprises an identifier (e.g., a number of bits) that represents a packet's Forwarding Equivalence Class (FEC), which is a group of packets that are forwarded in the same manner (e.g., over the same network path). The MPLS label in a packet can serve as an index into a forwarding table which specifies the next node, or next hop, for the packet. The path associated with a virtual circuit within an MPLS network—this virtual circuit path referred to as a Label Switched Path (or LSP)—is delineated by one or more MPLS labels that are, at various times, encapsulated into packets propagating over this path. Because of the ability to create LSRs through an MPLS network, MPLS supports priority-based routing—e.g., QoS and/or Class of Service (CoS)—as well as traffic engineering schemes.

As noted above, the path of a packet through an MPLS network is defined by MPLS labels. These labels include the information needed to determine a packet's route through the network and, other than examining a label to determine the next hop for a packet, the nodes within the MPLS network (e.g., the LSRs) do not have to make routing decisions. A packet arriving at an ingress LER of an MPLS network will receive a label indicating the packet's first hop in the network. When the packet is received at an LSR within the core of the MPLS network, the LSR may simply remove (or "POP") the label from the packet and then replace (or "SWAP") that label with another label. As the packet travels through the MPLS network, that packet may, at any time, have multiple labels (i.e., a "label stack") that have been encapsulated within the packet. When the packet reaches the edge of the MPLS network, the egress LER will POP all labels from the label stack in order to make a forwarding decision for the packet.

Each node in an MPLS network maintains a forwarding table including an Incoming Label Mapping (ILM) table and a Next Hop Label Forwarding Entries (NHLFE) table. The ILM table at a given node maps each incoming label at that node to an associated action and, perhaps, to an entry in the NHLFE table, which will specify the next-hop for an incoming packet. For example, when a packet is received at an MPLS network node, a look-up is performed in that node's ILM table based upon the label of the incoming packet, and the entry of the ILM table corresponding to the incoming label may specify an action, such as SWAP, and this ILM table entry will map to an entry in the NHLFE table. The entry of the NHLFE table will then specify a new label that is to replace the incoming label, and this NHLFE table entry may also specify an outgoing port.

At each egress LER of an MPLS domain, there will not be an NHLFE table, as there is no next-hop within the MPLS domain for any packet arriving at an egress node. Thus, at any egress LER, a look-up in that LER's associated ILM table can inform the egress LER how to forward or otherwise dispose of a labeled packet. As previously suggested, a packet received at the egress LER may contain a label stack, rather than a single label. Should a label stack be encapsulated in a received packet, the egress LER may need to "look" at each label in the stack one-by-one in order to determine what action to take with respect to the packet.

The ILM table associated with an egress LER is usually stored in an external (e.g., off-chip) memory, as many processing devices do not include sufficient on-chip memory to hold the entire ILM table. Thus, should the egress LER receive a packet including multiple labels, the LER may need to POP each label from the stack one-by-one. However, because the ILM table is located in off-chip memory, the look-up based on each label will require a separate access to external memory. For a packet including a large label stack, the number of external memory accesses needed to process the label stack can be very time consuming. For applications requiring a high throughput, these external memory accesses can adversely affect performance of the MPLS network.

BRIEF DESCRIPTION OF THE DRAWINGS

FIGS. 3B–3E are schematic diagrams, each illustrating an ILM table and a NHLFE table for one of the nodes in the network of FIG. 3A.

DETAILED DESCRIPTION

Embodiments of a method and device for handling packets including Multiprotocol Label Switching (MPLS) labels are disclosed. When a labeled packet is received at an egress node of an MPLS network, the "top" label in the packet's label stack is accessed and a look-up operation performed in the egress node's ILM table to find an entry matching the top label. While performing the look-up based upon the top label, the entries associated with a number of other labels in the stack are also identified in the ILM table, and these entries are fetched and stored in a cache memory. Subsequent look-ups for the other labels can then be found in the cache memory.

Figure 1:
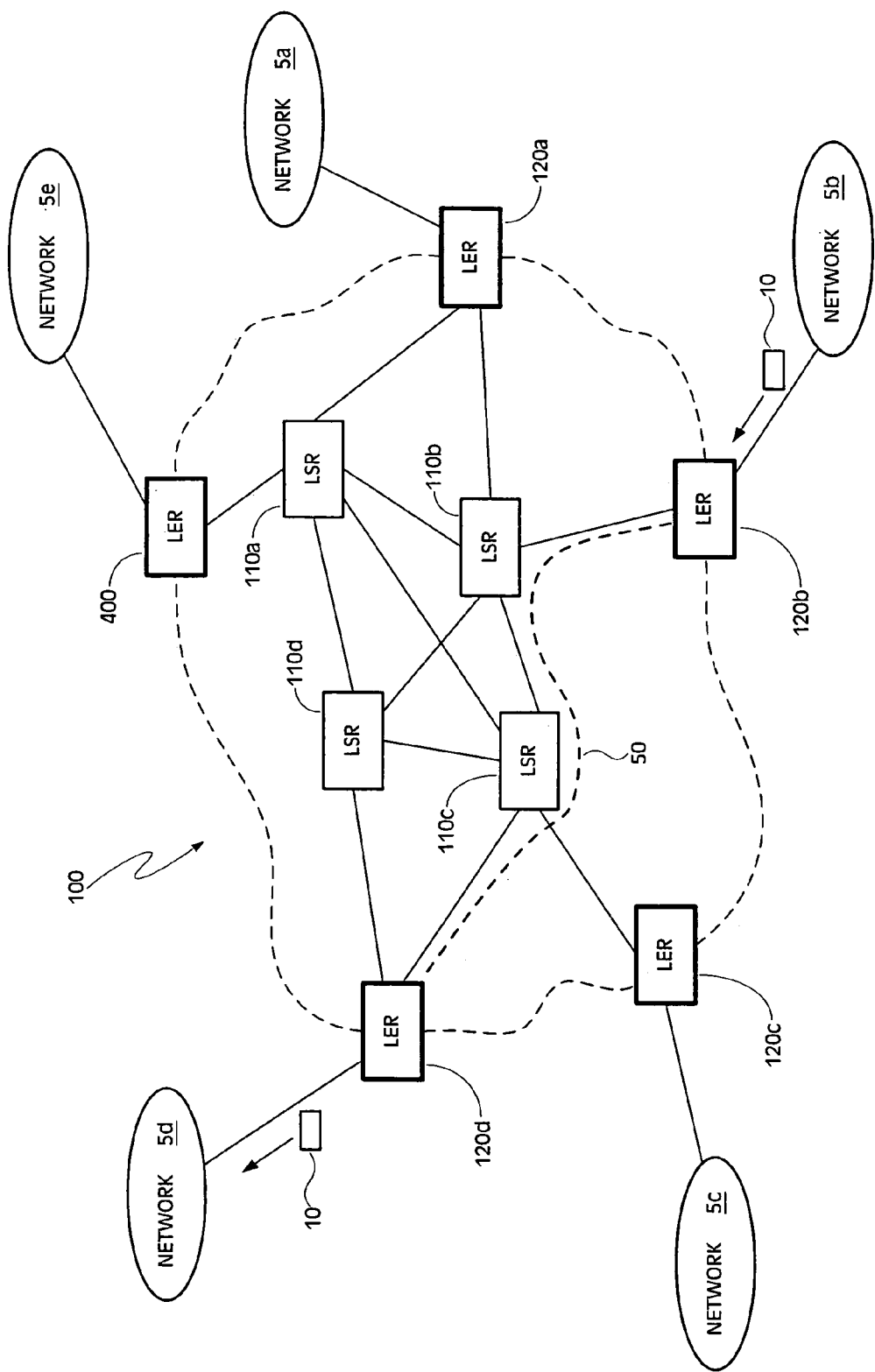
FIG. 1 is a schematic diagram illustrating an embodiment of an MPLS network.

Illustrated in FIG. 1 is an embodiment of an MPLS network 100. The MPLS network 100 includes a number of nodes located at the edge of the network 100, and each of these edge nodes is referred to as Label Edge Router (LER). In the embodiment of FIG. 1, the MPLS network 100 includes edge nodes 120a, 120b, 120c, 120d, and 400. The core of the MPLS network 100 comprises a number of routers, each router in the core of the network being referred to as a Label Switching Router (LSR). For the embodiment shown in FIG. 1, the MPLS network 100 includes LSRs 110a, 110b, 110c, and 110d. Each of the LERs 120a–d, 400 is coupled with at least one of the LSRs 110a–d, and each of the LSRs 110a–d is coupled with at least one other LSR (and, perhaps, one of the LERs). The connection between any two nodes—e.g., between two LSRs or between an LER and an LSR—in the MPLS network 100 may be established over any suitable medium, such as wireless, copper wire, fiber optic, or a combination thereof.

Each of the edge nodes 120a–d, 400 is coupled with another network. For example, LER 400 is coupled with network 5e, LER 120a is coupled with network 5a, LER 120b is coupled with network 5b, and so on. The networks 5a–5e may each comprise any type of network, such as a Local Area Network (LAN), a Metropolitan Area Network (MAN), a Wide Area Network (WAN), a Wireless LAN (WLAN), or other network. Each of the networks 5a–e may comprise a connectionless network (e.g., an IP network) or, alternatively, a connection-oriented network (an ATM or frame relay network). The LERs 120a–d, 400 may be coupled with their respective network 5a–5e via any suitable medium, including a wireless, copper wire, and/or fiber optic connection using any suitable protocol (e.g., TCP/IP, where TCP is the Transmission Control Protocol). See, e.g., IETF RFC 79, *Internet Protocol* (1981), and IETF RFC 793, *Transmission Control Protocol* (1981).

When a packet (or frame, cell, etc.) arrives at the MPLS network 100 from any of the networks 5a–5e, the packet will be received at one of the edge nodes 120a–d, 400. The LER receiving a packet from an external network—i.e., a packet not including an MPLS label, as explained below—is referred to as the "ingress LER." The ingress LER will determine a route for the packet through the MPLS network 100 and assign the packet to a Forwarding Equivalence Class (FEC). An FEC represents a group of packets that share the same requirements for their transport, and assignment of a packet to a particular FEC may be based on the packet's destination address, as well as other data in the packet's header. Based on the packet's FEC, the ingress LER will attach a label to the packet, and the packet is then forwarded to the next hop (e.g., one of the LSRs) in the packet's route. MPLS labels will be explained in more detail below.

The packet forwarded by the ingress LER into the core of the MPLS network 100 is then transmitted by one or more LSRs through the network's core. However, the LSRs 110a–d do not perform traditional routing functions (e.g., packet classification, route determination, etc.). Rather, the LSRs simply access the packet's MPLS label (or label stack), and the label will inform the LSR as to what to do next with the packet. More specifically, the LSR receives the incoming label and interface (e.g., a port specification) and, using the incoming MPLS label as an index into a forwarding table (e.g., ILM and NHLFE tables), the LSR determines an outbound label and interface, which specifies the next hop for the packet. The process of accessing a label at an LSR, removing the label, and adding a new label to a packet is referred to as a "SWAP" operation. All forwarding within an MPLS domain (i.e., a collection of MPLS enabled devices) is performed using labels, and route determination and FEC assignment is performed only once (at the ingress LER).

When the packet exits the core of the MPLS network, the packet will again arrive at one of the edge nodes, and this node is referred to as the "egress LER." The egress LER will access the packet's label (or label stack), and remove the label from the packet. The process of removing an MPLS label from a packet is referred to as a "POP" operation. Based on the packet's label and/or the contents of the packet's header, the egress LER (e.g., one of the end nodes 120a–d, 400) will then forward the packet to the external network (e.g., one of the networks 5a–e). The handling of labels at the egress LER is described below in greater detail. It should be noted that a packet's MPLS label (or labels) may be removed at the penultimate LSR, in which case the egress LER forwards the packet based on information contained in the packet's header.

The MPLS network 100 of FIG. 1 is presented to illustrate a simplified network topology useful for explaining the disclosed embodiments, and no unnecessary limitations should be inferred from this figure. Thus, it should be understood that the MPLS network 100 shown in FIG. 1 is intended to represent an exemplary embodiment of such a network and, further, that the MPLS network 100 may have any suitable configuration. For example, the MPLS network 100 may include additional nodes within its core (i.e., additional LSRs), as well as additional edge nodes. Further, the MPLS network 100 may be coupled with other external networks. It should also be understood that the network 100 may not include all of the components illustrated in FIG. 1.

An MPLS label comprises an identifier that indicates a particular FEC to which a packet belongs, and all packets belonging to a particular FEC will be assigned the same label at any given node within the MPLS network 100. MPLS labels are locally significant and, generally, the binding of a label to a FEC is recognized between only two nodes in an MPLS domain. Thus, a label is useful (and relevant) across a single link between two nodes, and any given FEC will have different labels between different nodes. Label assignment decisions may be based on a number of criteria—e.g., QoS and/or CoS considerations, traffic engineering, unicast vs. multicast routing, etc.—and the actual value of a label may be based on a variety of factors—e.g., a packet's destination address (or other header data), a VPI (virtual path identifier) and/or VCI (virtual circuit identifier) or other link layer information—or the value of a label may be arbitrary. As noted above, labels are locally significant, and a set of labels may be unique across all interfaces of a node (i.e., a per platform basis) or, alternatively, a set of labels may be unique only to a certain interface or port (i.e., a per interface basis).

Generally, labels are determined by downstream nodes and distributed upstream. Label distribution is governed by a label distribution protocol; however, the MPLS protocols do not mandate a single method or protocol for distributing labels. For example, the procedure utilized within MPLS network 100 for distributing labels may, in one embodiment, conform to IETF RFC 3036, *LDP Specification* (2001). However, it should be understood, as previously suggested, that the method of label distribution is not limited to this protocol. Any two nodes exchanging labels may be referred to as "label distribution peers."

Figure 2:
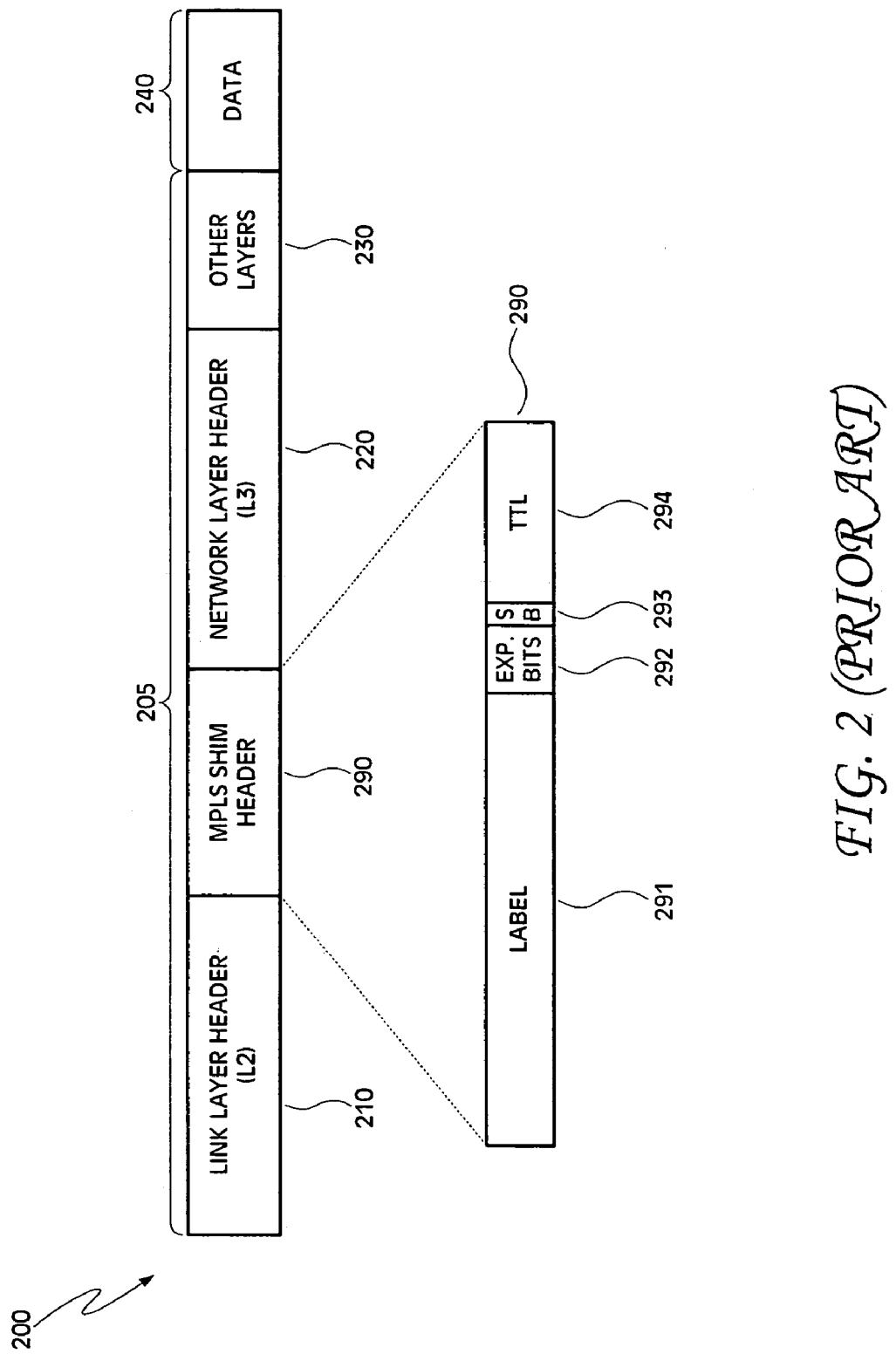
FIG. 2 is a schematic diagram illustrating an exemplary packet including an MPLS label.

An MPLS label is typically encapsulated within a packet between the Layer 2 header data and the Layer 3 header data. This is illustrated in FIG. 2, which shows a packet 200 having a header 205 and a payload or data 240. The header 205 includes a link layer header 210, a network layer header 220, and header data associated with other layers 230. Encapsulated between the link layer header 210 and the network layer 220 is an MPLS "shim" header 290. As such, the MPLS shim 290 is neither part of Layer 2 or Layer 3, but provides a way of relating link layer and network layer information. It should be understood, however, that label encapsulation is not limited to the scheme shown in FIG. 2 (e.g., a label may be encapsulated as part of the link layer header).

With continued reference to FIG. 2, the MPLS shim header 290 comprises 32 bits, including a label 291 (20 bits), experimental bits 292 (3 bits), a stack bit 293 (1 bit), and a time-to-live (TTL) value 294 (8 bits). The label 291 represents the value of the MPLS label. Experimental bits 292 may, for example, be used to designate characteristics such as QoS and/or CoS. The stack bit 293 may be set to indicate the presence of a label stack (i.e., multiple 32 bit shim headers). Label stacks are discussed in more detail below. The TTL 294 is a value representing the "life" of the packet, and this element of the shim is used to protect against forwarding loops. The TTL is decremented by one whenever the packet passes through a node and, if the TTL reaches zero before the packet arrives at its destination, the packet is discarded.

It will be appreciated by those of ordinary skill in the art that the format of a packet is not limited to that shown and described with respect to FIG. 2 (e.g., type and number of fields may vary, etc.). Generally, a communication will be referred to herein as a "packet." However, it should be understood that the disclosed embodiments are applicable to any type of communication (e.g., packets, cells, frames, etc.), irrespective of format or content.

Operation of the MPLS network 100 may be better understood by reference to an example. Referring back to FIG. 1, a packet 10 is received at LER 120b from network 5b, and LER 120b is, therefore, the ingress LER for the packet. The ingress LER 120b assigns the packet 10 to an FEC and determines a route for the packet through the MPLS domain. The ingress LER 120b then encapsulates a label into the packet 10 and transmits the packet to the core of the MPLS network 100. The packet 10 is received at LSR 110b, and this LSR will access the label placed in the packet by the ingress LER 120b. Using the incoming label, the LSR 120b will perform a look-up in an Incoming Label Mapping (ILM) table.

The ILM table provides a mapping between incoming labels and actions that are to be taken with respect to any label. More specifically, the ILM table maps an incoming label to an associated action (e.g., SWAP or POP) and, perhaps, to an entry in a Next Hop Label Forwarding Entries (NHLFE) table, the NHLFE table containing information needed to forward a packet. For a received packet, the information contained in an entry of the NHLFE table may specify the packet's next hop, this next hop being specified by an outbound label that is added to the packet (an operation referred to as "PUSH"), as well as an interface or port specification for the packet.

Returning to our example, based on the incoming label, the ILM table will specify an action (e.g., POP) for the label, and will provide a mapping to an entry in the NHLFE table. The corresponding entry of the NHLFE table will specify an outbound label and an interface. The LSR 110b will then POP the incoming label and encapsulate the new label into the packet 10. The packet is then transmitted to the next hop on its route, which in this example is LSR 110c. LSR 110c also performs a look-up in its ILM and NHLFE tables and, based on the result, POPs the existing label and SWAPs this label with a new label. The packet 10 is subsequently transmitted to the next hop, which is LER 120d (LER 120d becoming the egress LER). The egress LER 120d will POP the incoming label (if present) from the packet 10, and forward the packet onto the network 5d. As the packet 10 is transmitted from egress LER 120d, the packet is leaving the MPLS domain, and subsequent routing decisions for the packet are made using other (non-MPLS) routing mechanisms. Note that the egress LER 120d does not include an NHLFE table (or its NHLFE table is unpopulated), as all subsequent forwarding of the packet is based on non-MPLS routing (e.g., no additional labels are PUSHed onto the packet by the egress LER 120d).

As noted above, labels are locally significant. As the packet 10 enters the MPLS domain at ingress LER 120b, a first label is assigned to the packet based, at least in part, on the packet's FEC. However, this first label is only meaningful between LER 120b and LSR 10b (which are label distribution peers). At LSR 110b a new label is added to the packet 10, and this second label is useful only across the link between LSR 110b and LSR 110c (which, again, are label distribution peers). Similarly, a third new label encapsulated into the packet at LSR 110c has meaning only between the peers LSR 110c and LER 120d. However, it should be understood that, although labels are locally significant, all labels added to the packet 10 are associated with the same FEC. Note also that LSR 110c (the penultimate hop in the packet's path) may POP the incoming label from the stack and forward the packet to LER 120d without adding a new label. This result is possible (and, in some instances, desirable) because LER 120d is located at the edge of the MPLS domain, and LER 120d can forward the packet to network 5d without resort to MPLS labels (e.g., based on traditional routing schemes, such as IP).

Still referring to FIG. 1, the packet 10 traverses a path 50 through the MPLS network 100. The sequence of nodes comprising the path of a packet through an MPLS domain is referred to as a "Label Switching Path" (LSP). Generally, an LSP includes an ingress LER, one or more LSRs, and an egress LER. For example, LSP 50 includes ingress LER 120b, LSRs 110b and 110c, and egress LER 120d. The set of nodes included in an LSP may be specified hop-by-hop or, alternatively, the set of nodes of an LSP may be explicitly specified. When the route for an LSP is selected on a hop-by-hop basis, each MPLS node independently chooses the next hop for each FEC. For explicit routing, the ingress LER (or egress LER) specifies all nodes in the path. Generally, explicit LSPs need to be specified at the time labels are assigned and distributed. Explicit routing of MPLS labeled packets may be useful for a number of applications, including policy-based routing (e.g., QoS or CoS), traffic engineering, as well as others.

In the above example, the packet 10 was assumed to have, at any given time, a single label. However, a packet may include multiple MPLS labels—i.e., a label stack. A label stack may result from nested tunnels within an MPLS domain (the use of tunnels in an MPLS network will be explained below). It should be understood, however, that tunneling is not the only source of label stacks (e.g., a stack may be created by pushing a "stack attribute" on top of an existing label). Generally, MPLS labels within a packet are organized in a last-in, first-out manner, wherein handling of the packet is based on the last-in, or "top," label. A label stack could be thought of as having N levels, where level N is the top label in the stack and level 1 is the "bottom" (or first-in) label. The use of MPLS label stacks allows for hierarchical operation (e.g., nested tunnels) in an MPLS domain. The entire label stack may be POPed from a packet at the egress LER or, alternatively, at the penultimate LSR for the packet.

As noted above, a label stack can be present in a packet because the path of that packet through an MPLS domain encompasses nested tunnels. Generally, a tunnel is an LSP associated with a particular FEC. To place a packet in a tunnel, the start point of the tunnel (e.g., an LER or LSR) places the appropriate label onto the packet's label stack and then sends the packet to the next hop in the tunnel. The packet continues through the tunnel until it reaches the tunnel's endpoint (e.g., another LER or LSR), the tunnel's endpoint being a label distribution peer of the start point. Tunnels may be nested within one another to any depth, and such tunnels may be used to support policy-based routing schemes and traffic engineering.

Figure 3A:
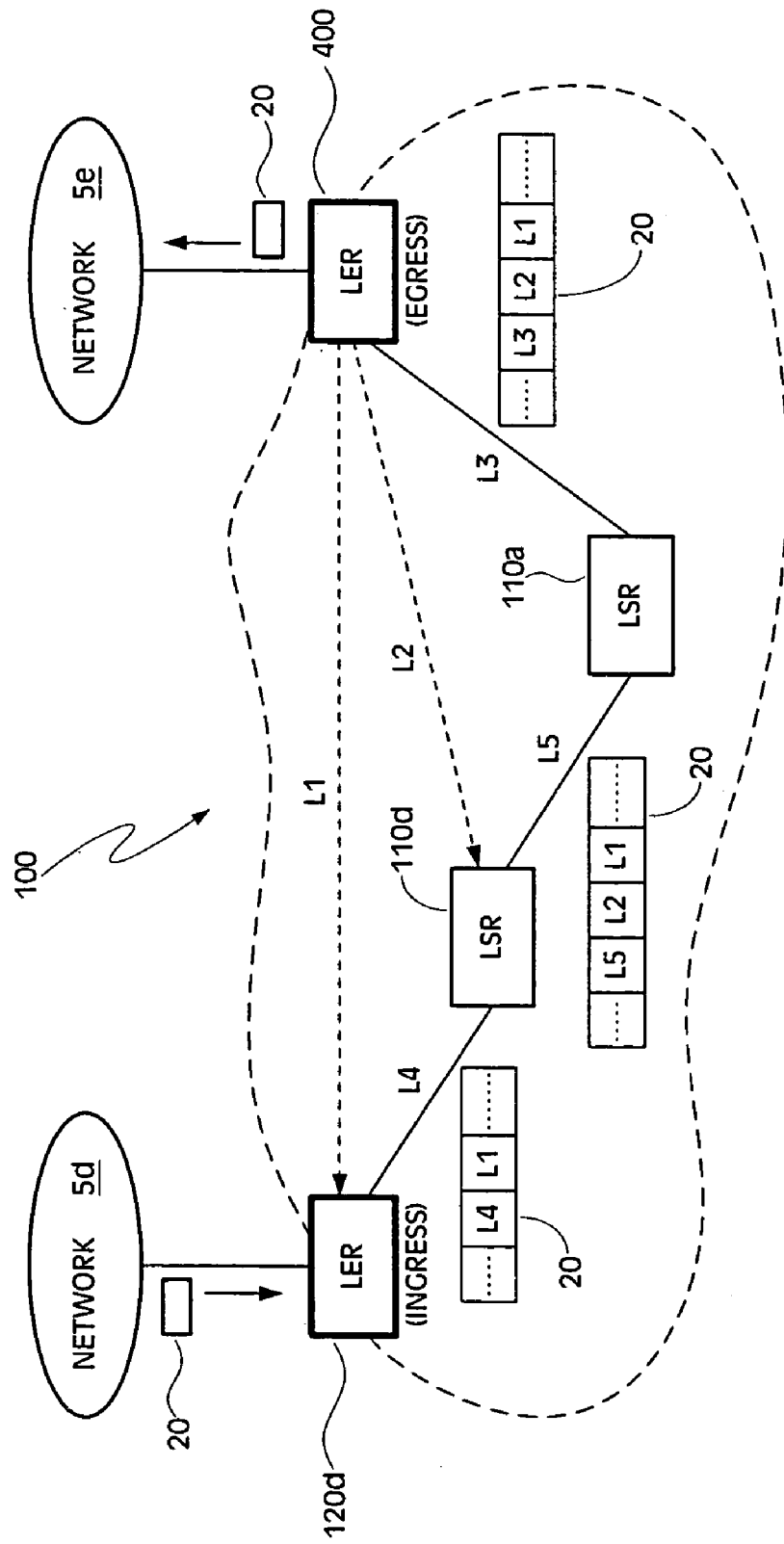
FIG. 3A is a schematic diagram showing a portion of the MPLS network illustrated in FIG. 1.

The use of tunnels and label stacks may be better understood with reference to an example, and this example will be introduced using FIG. 3A, which shows a portion of the MPLS network 100 of FIG. 1. Referring to FIG. 3A, edge node 120d is coupled with LSR 110d, which in turn is coupled with LSR 110a. LSR 110a is coupled with edge node 400; however, edge node 400 is not otherwise connected to edge node 120d.

Suppose that, for a particular FEC X, the LER 400 has distributed three labels L1, L2, L3 to its attached nodes LER 120d, LSR 110d, and LSR 110a, respectively. Essentially, LER 400 is informing LER 120d that, should this node send a packet associated with FEC X to LER 400, attach the label L1 to the packet. Similarly, LER 400 has informed LSRs 110d, 110a that, should these nodes send an FEC X packet to LER 400, they should attach labels L2 and L3, respectively, to the packet. Also, for FEC X, the LSR 110d has informed LER 120d to use label L4, and the LSR 110a has informed LSR 110d to use label L5 for FEC X. Note that LER 400 and LER 120d are label distribution peers, although these two nodes are not directly coupled to one another. Based on the labels distributed, each of the LER 120d, LSR 110d, LSR 110a, and LER 400 will create an ILM table and an NHLFE table, and examples of the ILM and NHLFE tables for these nodes are shown in FIGS. 3B through 3E, respectively. It should be noted that, although the ILM and NHLFE tables are illustrated in FIGS. 3B–3E as separate tables (an approach which may be implemented to improve, for example, scalability), an ILM table and NHLFE table may, in other embodiments, be realized as a single data structure.

A packet 20 arrives at LER 120d, and this edge node is the ingress LER for packet 20. The ingress LER 120d assigns the packet 20 to FEC X (based, for example, on the packet's destination address, which in this example is an address in network 5a connected with LER 400 that is specified as "ADD 2"). Thus, the ingress LER 120d determines that the packet 20 should be sent to LER 400 using FEC X, and the ingress LER attaches the label L1 to the packet. However, the ingress LER 120d cannot directly transmit the packet 20 to LER 400, so the ingress LER transmits the packet to the LSR 110d. Prior to sending the packet to LSR 110d, the ingress LER 120d pushes another label L4 onto the label stack of packet 20, as this is the label distributed to LER 120d from LSR 110d for FEC X.

The above-described operations are derived from an FTN (FEC to NHLFE) table 301a and the NHLFE table 301b at ingress LER 120d, both of which are shown in FIG. 3B. For a packet arriving from an external network, the ingress LER 120d includes the FTN table 301a rather than an ILM table (although the edge node 120d will include an ILM table to handle packets arriving from the MPLS domain), and the FTN table 301a maps addresses (and/or FECs) to entries in the NHLFE table. Note that for a packet destined to ADD 2 (i.e., FEC X), the ingress LER should PUSH labels L1 and L4 onto the packet. Also, the ingress LER should transmit the packet on interface "PORT 1". Thus, the packet 20 exits ingress LER 120d with a label stack comprising labels L4 and L1.

The packet 20 arrives at LSR 110d, and this LSR accesses the top label in the label stack (i.e., label L4). Referring to the ILM table 302a for LSR 110d shown in FIG. 3C, for any packet having an incoming label of L4, that label is to be replaced (a SWAP operation). As shown in the NHLFE table 302b for LSR 110d, the new labels L2 and L % are to be PUSHed onto the packet's label stack. Thus, LSR 110d removes the label L4 and replaces it with labels L2 and L5. Also, with reference to the NHLFE table 302b, the packet 20 is to be transmitted out interface "PORT 1." Therefore, at this juncture, the label stack of packet 20 includes the labels L5, L2, and L1.

The LSR 110a receives the packet 20 and accesses the top label in the packet's label stack. The top label is label L5 and, according to this LSR's ILM table 303a shown in FIG. 3D, for an incoming label of L5, a SWAP operation is to be performed. Referring to the NHLFE table 303b for LSR 110a, which is also shown in FIG. 3D, a new label L3 is to be PUSHed onto the label stack, and the packet is to be transmitted via interface "PORT 1." Thus, LSR 110a performs a SWAP operation to replace label L5 with label L3, and the packet is transmitted over interface "PORT 1" to the LER 400. Note that, as the packet 20 is transmitted over a link from LSR 110a to LER 400, the now packet includes a label stack comprised of labels L3, L2, and L1 (as shown in FIG. 3A).

The packet 20 arrives at LER 400 (the egress LER) with three labels L3, L2, and L1, wherein label L3 is the top label. The egress LER 400 will process these three labels one at a time, performing the action associated with each label.

Referring to FIG. 3E, which illustrates the ILM table 304a for egress LER 400, for an incoming packet having the label L3, a POP operation is to be performed to remove the label. Similarly, for an incoming packet having the label L2, another POP operation should be performed to remove this label from the label stack, and for an incoming packet having the label L1, yet another POP operation is to be performed to remove this label. Accordingly, egress LER 400 performs three consecutive POP operations to remove the labels L3, L2, and L1. The egress LER 400 then forwards the packet 20 on to the network 5e based upon non-MPLS routing mechanisms. Note that, for packets received from the MPLS domain that are destined to the external network 5e, the NHLFE table 304b (see FIG. 3E) of LER 400 is unpopulated (or nonexistent), although LER 400 will maintain a NHLFE table for packets arriving from external network 5e that are to be routed through the MPLS domain (e.g., see the NHLFE table 301b of LER 120d).

Figure 3F:
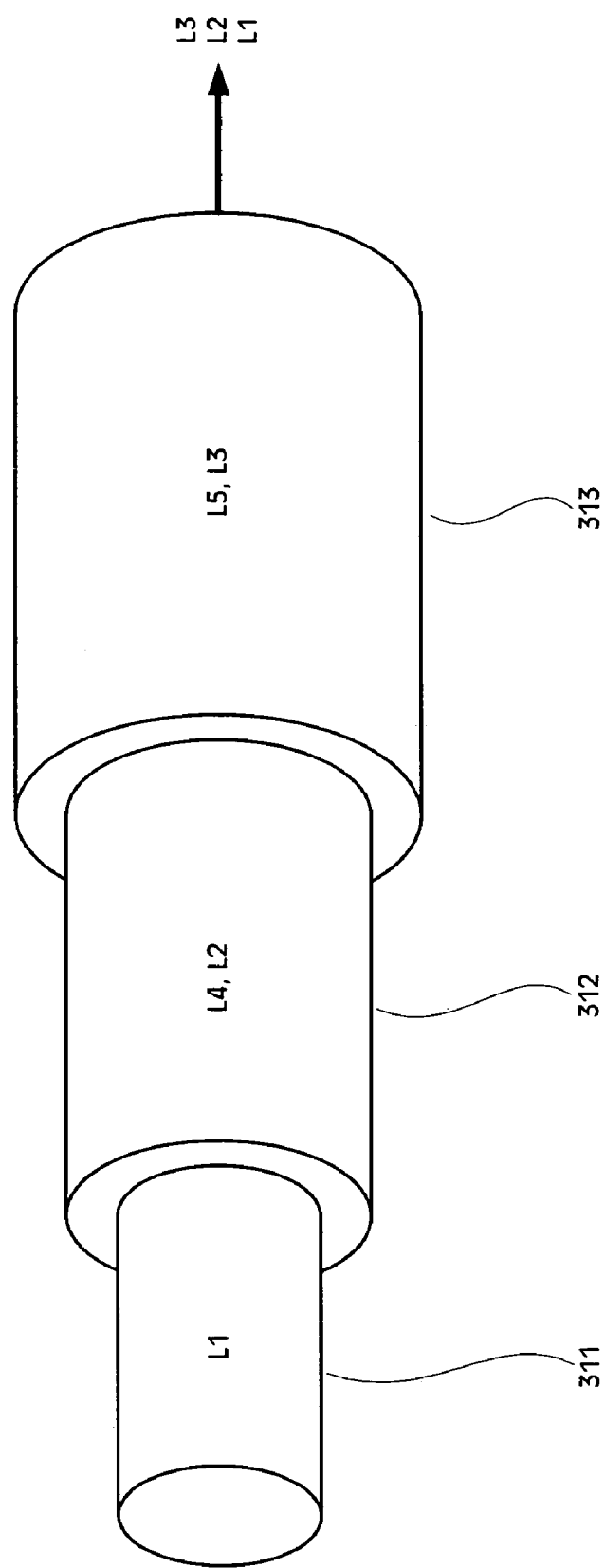
FIG. 3F is a schematic diagram illustrating an embodiment of nested tunnels created in the MPLS network of FIG. 3A.

In summary, the packet 20 associated with FEC X arriving at ingress LER 120d and destined for egress LER 400 will travel over three nested tunnels to reach the egress LER 400. These nested tunnels are illustrated schematically in FIG. 3F. Referring to this figure, a first tunnel 311 is associated with the label L1. Nested over the first tunnel 311 is a second tunnel 312, which is associated with labels L4 and L2. A third tunnel 313 is nested on top of the first and second tunnels 311, 312. The third tunnel 313 is associated with labels L5 and L3. A packet exiting the nested tunnels 311, 312, 313 will include the label stack comprising labels L3, L2, and L1. These nested tunnels are created because LER 120d and LER 400 are label distribution peers, but there is not direct connectivity between these two nodes.

To process the label stack encapsulated in packet 20, the LER 400 will need to perform three separate look-ups, one for each of the labels L3, L2, and L1 in the label stack. As noted above, for conventional edge nodes in an MPLS network, the ILM table was stored in an external or off-chip memory and, therefore, separate external memory accesses were required to process each label in a label stack. These external memory accesses can be time consuming, and this inefficiency may be intolerable for high throughput applications.

The MPLS network 100 can minimize the above-described inefficiencies associated with handling of the label stack using a unique caching scheme, as will now be described. In one embodiment, the caching scheme is implemented in at least the LER 400; however, it should be understood that the disclosed embodiments may be applied at any edge node of an MPLS domain.

Figure 4:
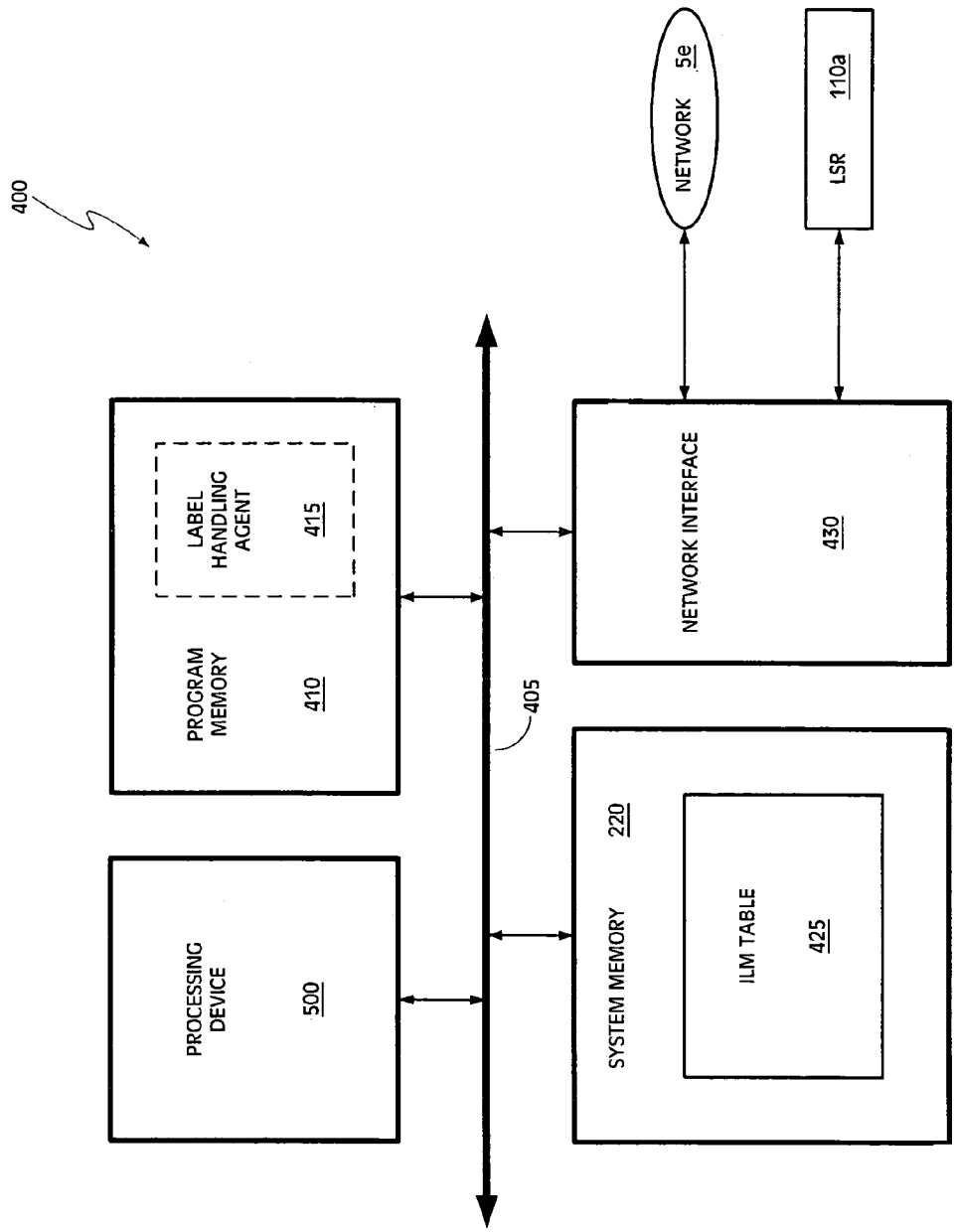
FIG. 4 is a schematic diagram illustrating an embodiment of an egress node, which may form part of the MPLS network of FIG. 1.

Referring now to FIG. 4, an embodiment of the edge node 400 is illustrated. The edge node 400 includes a bus 405 to which various components are coupled. Bus 405 is intended to represent a collection of one or more buses—e.g., a system bus, a Peripheral Component Interconnect (PCI) bus, a Small Computer System Interface (SCSI) bus, etc.—that interconnect the components of edge node 400. Representation of these buses as a single bus 405 is provided for ease of understanding, and it should be understood that the edge node 400 is not so limited. Those of ordinary skill in the art will appreciate that the edge node 400 may have any suitable bus architecture and may include any number and combination of buses.

Coupled with bus 405 is a processing device (or devices) 500. The processing device 500 may comprise any suitable processing device or system, including a microprocessor, a network processor, an application specific integrated circuit (ASIC), or a field programmable gate array (FPGA), or similar device. Embodiments of the processing device 500 are illustrated below in FIGS. 5A and 5B, respectively, as well as the accompanying text.

Also coupled with the bus 405 is program memory 410. In one embodiment, the disclosed label handling methods are implemented as a software routine comprising a set of instructions, and these instructions—e.g., label handling agent 415—may be stored in the program memory 410. Upon system initialization and/or power up, the instructions may be transferred to on-chip memory of the processing device 500, where they are stored for execution on the processing device. The program memory may comprise any suitable non-volatile memory. In one embodiment, the program memory 410 comprises a read-only memory (ROM) device or a flash memory device. Note that, in an alternative embodiment, the edge node 400 may not include a separate program memory, as the set of instructions may be downloaded to the processing device 500 from, for example, another node in the MPLS domain (e.g., LSR 110a) or a node in an external network (e.g., a node in network 5e).

In another embodiment, the edge node 400 further includes a hard-disk drive (not shown in figures) upon which the label handling agent 415 may be stored. In yet another embodiment, the edge node 400 also includes a device (not shown in figures) for accessing removable storage media—e.g., a floppy-disk drive, a CD-ROM drive, and the like—and the label handling software is downloaded from a removable storage media into memory of the processing device 500 (or downloaded into the program memory 410). In yet a further embodiment, upon power up or initialization of the edge node 400, the label handling software is downloaded from a node in the network 5e and stored in memory of the processing device 500 (in which case, program memory 410 may not be needed).

Edge node 400 also includes system memory 420, which is coupled with bus 405. The system memory 420 may comprise any suitable type and/or number of memory devices. For example, the system memory 420 may comprise a DRAM (dynamic random access memory), a SDRAM (synchronous DRAM), a DDRDRAM (double data rate DRAM), and/or a SRAM (static random access memory), as well as any other suitable type of memory. During operation of edge node 400, the system memory 420 may store the ILM table 425 for edge node 400, as shown in FIG. 4. In another embodiment, as described below, the ILM table 425 may be stored in a memory of the processing device 500 (see FIG. 5B). The system memory 420 may also store an NHLFE table and/or an FTN table (not shown in FIG. 4), as previously described.

The edge node 400 further comprises a network interface 430 coupled with bus 405. The network interface 430 comprises any suitable hardware, software, or combination of hardware and software that is capable of coupling the edge node 400 with one or more core nodes (e.g., LSR 110a) in the MPLS network 100, as well as one or more other networks outside the MPLS domain (e.g., network 5e).

It should be understood that the edge node 400 illustrated in FIG. 4 is intended to represent an exemplary embodiment of such a device and, further, that this node may include many additional components, which have been omitted for clarity and ease of understanding. By way of example, the edge node 400 may include a chip set associated with the processing device 500, additional memory, one or more input devices (e.g., a keyboard, a pointing device such as a mouse, and a scanner or other data entry device), one or more output devices (e.g., a video monitor or an audio output device), as well as additional signal lines and buses.

The edge node 400 may also include a hard-disk drive and/or a device for accessing removable storage media, both as noted above. Also, it should be understood that the edge node 400 may not include all of the components shown in FIG. 4.

Figure 5A:
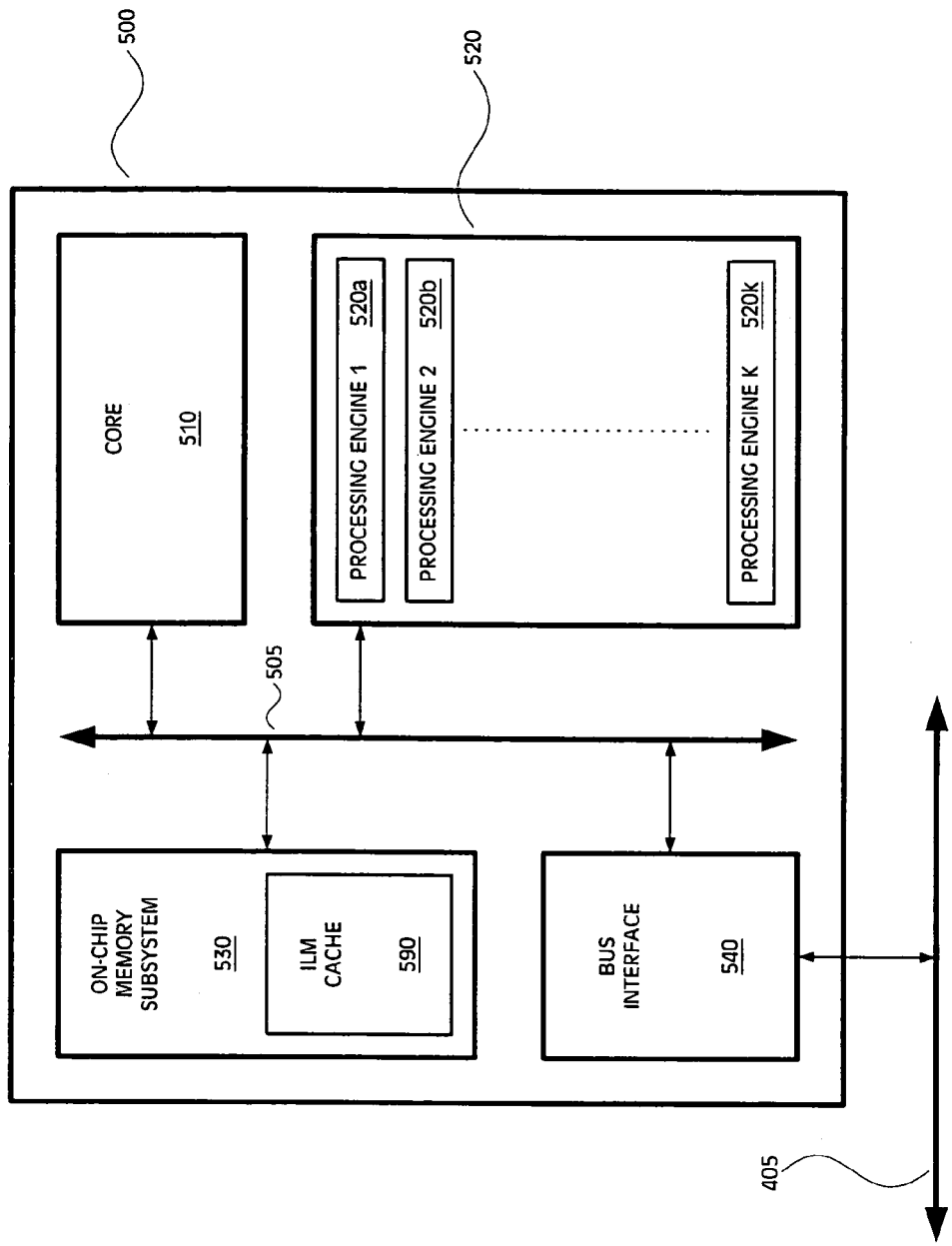
FIG. 5A is a schematic diagram illustrating one embodiment of a processing device, which may form part of the egress node of FIG. 4.
Figure 5B:
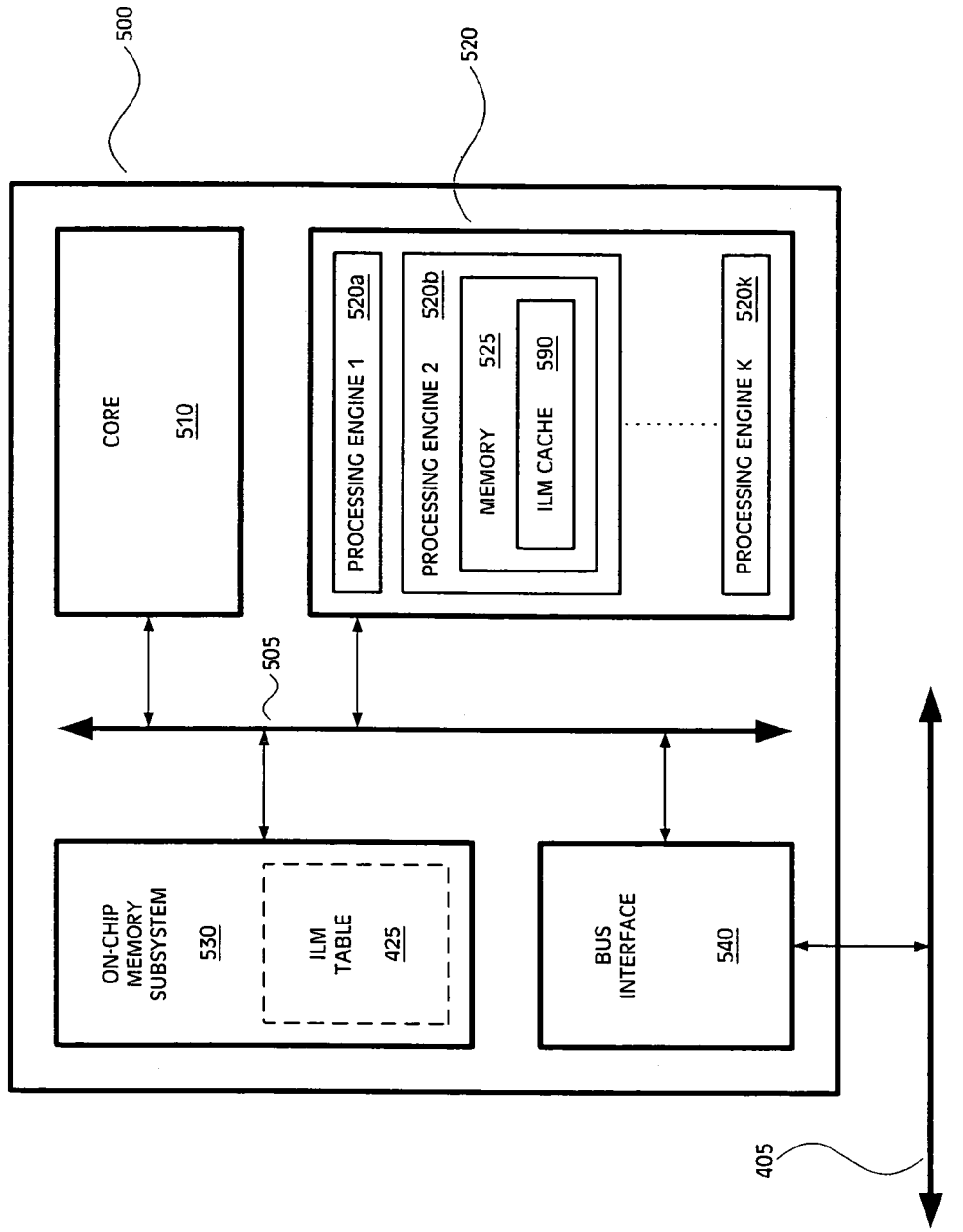
FIG. 5B is a schematic diagram illustrating another embodiment of a processing device, which may form part of the egress node of FIG. 4.

As previously noted, embodiments of processing device 500 are illustrated in each of FIGS. 5A and 5B. It should be understood, however, that the embodiments of processing device 500 shown in FIGS. 5A and 5B, respectively, are but a few examples of a processing device upon which the disclosed embodiments may be implemented. Those of ordinary skill in the art will appreciate that the disclosed embodiments may be implemented on many other types of processing systems and/or processor architectures.

Turning first to FIG. 5A, the processing device 500 includes a local bus 505 to which various functional units are coupled. Bus 505 is intended to represent a collection of one or more on-chip buses that interconnect the various functional units of processing device 500. Representation of these local buses as a single bus 505 is provided for ease of understanding, and it should be understood that the processing device 500 is not so limited. Those of ordinary skill in the art will appreciate that the processing device 500 may have any suitable bus architecture and may include any number and combination of buses.

A processing core 510 and a number of processing engines 520 (e.g., processing engines 520a, 520b, ..., 520k) are coupled with the local bus 505. In one embodiment, the core 510 comprises a general purpose processing system. Core 510 may execute an operating system and control operation of processing device 500, and the core 510 may also perform a variety of management functions, such as dispensing instructions to the processing engines 520 for execution.

Each of the processing engines 520a–k comprises any suitable processing system, and each may include an arithmetic and logic unit (ALU), a controller, and a number of registers (for storing data during read/write operations). Each processing engine 520a–k may, in one embodiment, provide for multiple threads of execution (e.g., four). Also, in another embodiment, one or more of the processing engines 520a–k may include a memory, as will be described below.

Also coupled with the local bus 505 is an on-chip memory subsystem 530. Although depicted as a single unit, it should be understood that the on-chip memory subsystem 530 may—and, in practice, likely does—comprise a number of distinct memory units and/or memory types. For example, such on-chip memory may include SRAM, SDRAM, DDRDRAM, and/or flash memory (e.g., flash ROM). It should be understood that, in addition to on-chip memory, the processing device 500 may be coupled with off-chip memory (e.g., system memory 420, etc.). In one embodiment, an ILM cache 590 is stored in the on-chip memory subsystem 530. Operation and use of the ILM cache 590 will be described below.

Processing device 500 further includes a bus interface 540 coupled with local bus 505. Bus interface 540 provides an interface with other components of edge node 400, including bus 405. For simplicity, bus interface 540 is depicted as a single functional unit; however, it should be understood that, in practice, the processing device 500 may include multiple bus interfaces. For example, the processing device 500 may include a PCI bus interface, an IX (Internet Exchange) bus interface, as well as others, and the bus interface 540 is intended to represent a collection of one or more such interfaces.

Referring now to FIG. 5B, another embodiment of the processing device 500 is illustrated. The embodiment of FIG. 5B is similar to that shown in FIG. 5A; however, in the embodiment of FIG. 5B, at least one of the processing engines 520b has an associated memory 525. In one embodiment, as shown in FIG. 5B, the ILM cache 590 is stored in the memory 525 of processing engine 520b. The memory 525 of processing engine 520b may comprise SRAM, ROM, EPROM (Erasable Programmable Read-Only Memory), or some type of flash memory (e.g., flash ROM). Further, although illustrated as discrete memory associated with a specific processing engine (i.e., engine 520b), it should be understood that, in an alternative embodiment, a single memory (or group of memories) may be shared by two or more of the processing engines 520a–k (e.g., by a time-division multiplexing scheme, etc.).

It should be understood that the embodiments of processing device 500 illustrated and described with respect to each of FIGS. 5A and 5B are but a few examples of a processing device that may find use with the disclosed embodiments and, further, that the processing device 500 may have other components in addition to those shown in FIGS. 5A and 5B, which components have been omitted for clarity and ease of understanding. For example, the processing device 500 may include other functional units (e.g., an instruction decoder unit, an address translation unit, etc.), a thermal management system, clock circuitry, additional memory, and registers. Also, it should be understood that a processing device may not include all of the elements shown in FIG. 5A or 5B.

In one embodiment, the label handling agent 415 is implemented in hardware (or a combination of hardware and software). For example, the label handling agent 415 may be implemented on either of the embodiments of processing device 500 shown in FIGS. 5A and 5B, or other similar device, that has been programmed in accordance with the disclosed embodiments.

In another embodiment, the label handling agent 415 comprises a set of instructions (i.e., a software application) run on a computing device—e.g., the edge node 400 illustrated in FIG. 4 or other suitable computing device—as noted above. The set of instructions may be stored locally in program memory 410 or, in another embodiment, the instructions may be stored in a remote storage device (e.g., a node on network 5e that is accessed via this network). The set of instructions is downloaded from the program memory, or the remote storage media, and stored on the processing device 500 (e.g., in on-chip memory subsystem 530 or in a memory of one or more of the processing engines 520a–k) for execution. In a further embodiment, the label handling agent comprises a set of instructions stored on a machine accessible medium, such as, for example, a magnetic media (e.g., a floppy disk or magnetic tape), an optically accessible disk (e.g., a CD-ROM disk), a flash memory device, etc. To run label handling agent 415 on edge node 400, a device for accessing removable storage media may access the instructions on the machine accessible medium, and the instructions may then be downloaded to processing device 500 (e.g., in memory subsystem 530 or a memory of one or more of the processing engines 520a–k) and executed.

Figure 6:
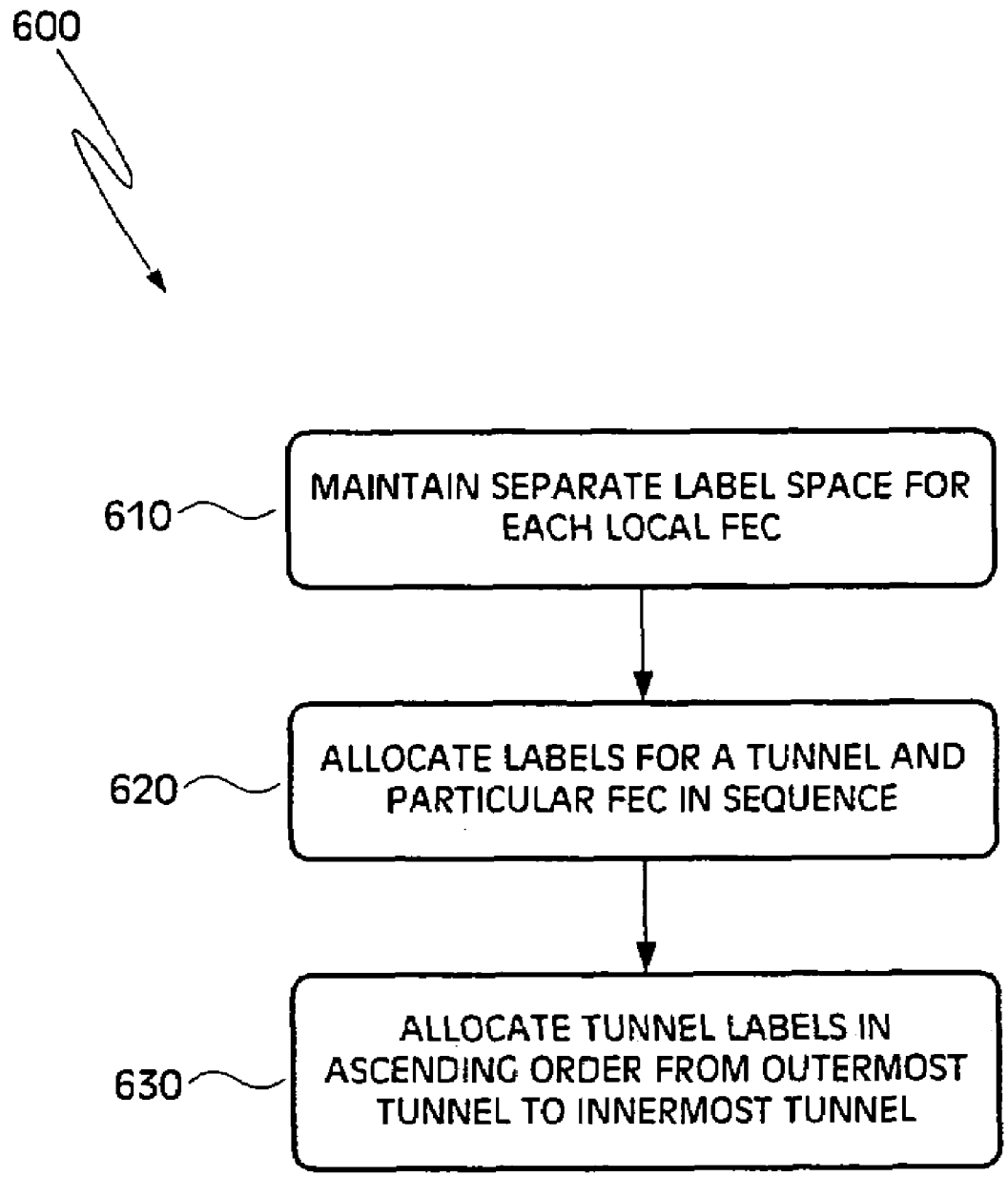
FIG. 6 is a block diagram illustrating an embodiment of a method of allocating MPLS labels.
Figure 7:
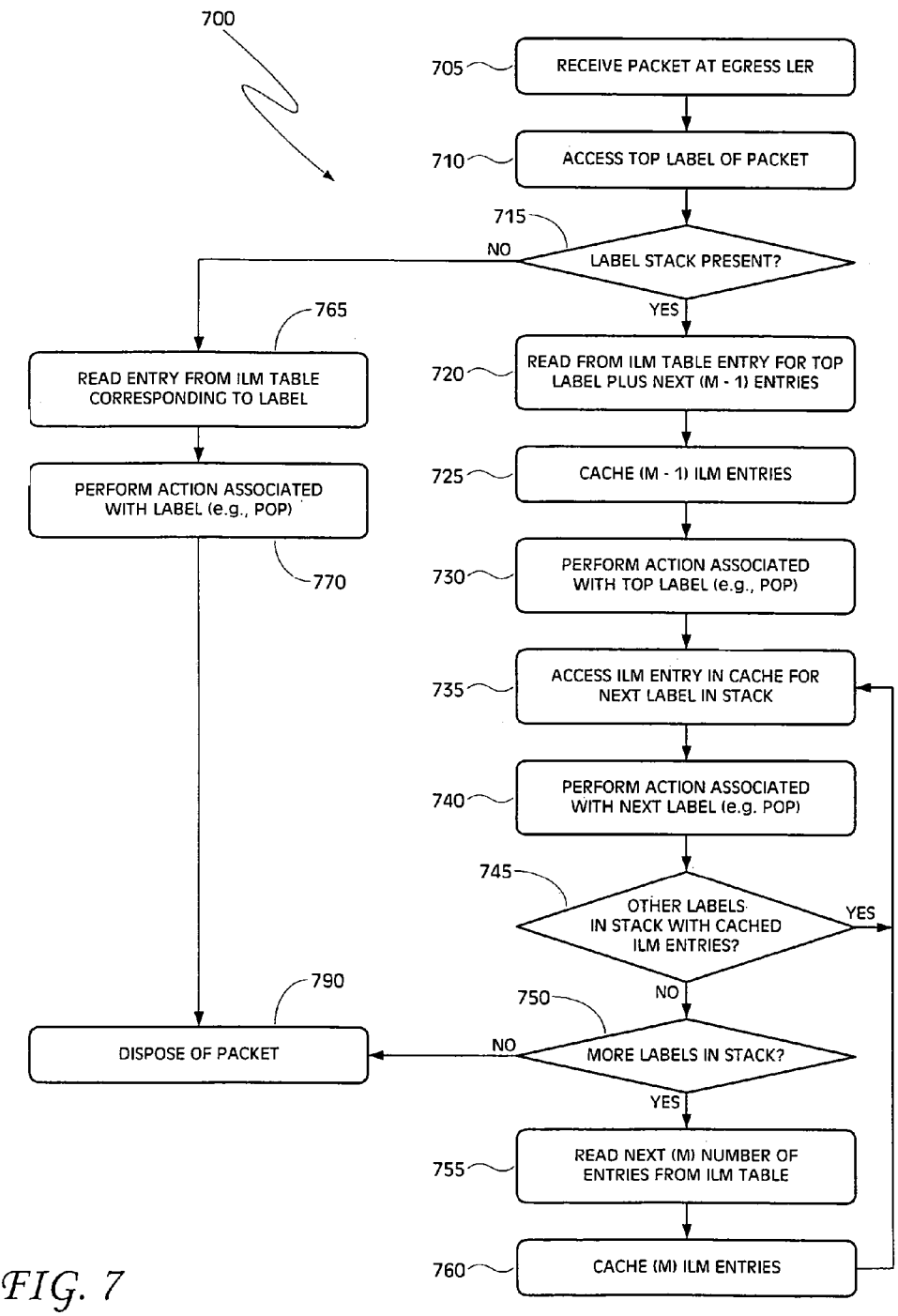
FIG. 7 is a block diagram illustrating an embodiment of a method of handling MPLS labels.

In one embodiment, there are two processes performed by the label handling agent 415: an MPLS label allocation process, and an MPLS label handling process. Illustrated in FIG. 6 is an embodiment of a method 600 of allocating MPLS labels, and illustrated in FIG. 7 is an embodiment of a method 700 for handling MPLS labels. As will be explained below, the method 600 for MPLS label allocation can facilitate the processing of MPLS labels. In one embodiment, the method 600 for allocating MPLS labels is performed in addition to, or on top of, any other label distribution protocol that is being utilized. The method 700 for handling MPLS labels employs a caching mechanism that utilizes the ILM cache 590 (or other suitable cache) to minimize the number of memory accesses needed to process a label stack. In one embodiment, the method 600 for allocating MPLS labels and the method 700 for handling MPLS labels may be implemented by the label handling agent 415 on the edge node 400 described above. However, although the disclosed embodiments of the methods 600 for label allocation and 700 for label processing are described below in the context of edge node 400, it should be understood, as suggested above, that the disclosed embodiments may be practiced on any other suitable hardware and/or software platform.

Referring first to FIG. 6, and to block 610 in particular, a separate label space is maintained for each local FEC. Normally, all labels, irrespective of FEC, are maintained in the same label space. However, providing a separate label space for each local FEC at edge node 400 helps to facilitate the disclosed caching mechanism (described in more detail below) by insuring that all labels in a packet's label stack and belonging to a particular FEC can be located in contiguous (or nearly contiguous) entries of the ILM table 425.

As set forth in block 620, labels for a given tunnel and FEC are allocated in sequence (e.g., L1, L2, L3, . . . ). If a packet's label stack includes a number of labels in sequence, then for a prescribed number of labels in the stack, a corresponding number of entries in the ILM table 425 can be readily accessed in a single read instruction. Otherwise, were the labels in the stack out of sequence, multiple read instructions would be necessary to access multiple entries of the ILM table. Thus, allocating labels in sequence (or at least nearly in sequence) also facilitates the disclosed caching mechanism.

Referring next to block 630, tunnel labels are allocated in ascending order from outermost tunnel to innermost tunnel. This result may be achieved by giving minimum label values to directly attached peers (e.g., label distribution peers) and maximum label values to peers that are discovered through extended discovery. For example, returning to FIG. 3F, were the tunnel labels allocated in ascending order form outermost tunnel to innermost tunnel, the ordering of the labels at the end point of the tunnels would be L1, L2, L3, which is opposite to that shown in FIG. 3F. Allocating labels in this manner further insures that the labels of a packet's label stack will be in sequence (see block 620).

The embodiment of the method 600 of allocating MPLS labels shown and described with respect to FIG. 6 assumes that the label space is linear and that linear searches are performed. However, it should be understood that the disclosed embodiments are not so limited and, further, that other alternative data structures may be used to realize an ILM table. For example, in another embodiment, the ILM table at the edge node of an MPLS domain may be implemented using a hash table. For a hash data structure, in order to insure that the labels in a label stack will occupy contiguous (or nearly contiguous) entries in the ILM table, all tunnel labels for a particular FEC may be allocated to the same primary basket. In other words, when a hash key is applied to each label in the label stack, all of the labels should be placed in the same primary basket. In an embodiment where an ILM table is realized as a hash table (or some other alternative data structure), the labels for a given FEC and/or tunnel may be out of sequence.

Turning now to FIG. 7, starting with block 705, a packet is received (from the MPLS domain) at the LER 400, which is acting as the packet's egress node. The received packet includes a label stack (e.g., see FIGS. 3A–3F, and the accompanying text above) or, perhaps, a single label. The top label (or only label) in the packet is then accessed, as set forth in block 710. With reference to block 715, whether a label stack is present is determined. Where a separate label space is maintained for each local FEC, the label value itself will be indicative of whether the label belongs to a tunnel, which would suggest the presence of a label stack. Alternatively, the presence of a label stack may be indicated by the stack bit (see FIG. 2, item 493). A label stack may comprise any number of labels.

Referring to block 720, if a label stack is present, a read operation is performed. The read operation will fetch from the ILM table 425 an entry corresponding to the top entry, as well as the next "M−1" entries (for a total of "M" number of entries). For example, the processing system executing the label handling agent 415 (e.g., one of the processing engines 520a–k shown in either FIG. 5A or FIG. 5B) may issue a read instruction as follows:

memory_read (base_address, offset, NoOfEntries)

where the variable "NoOfEntries" is the number of entries that is to be read from the ILM table 425, starting from the address specified by the "base_address" and "offset" variables. The "NoOfEntries" variable is set equal to the number "M". Thus, the top label plus the next "M−1" number of entries can be fetched using a single read operation, a result that is possible due, at least in part, to the label allocation scheme described above with respect to FIG. 6 and the accompanying text. More specifically, because the labels of a label stack are in sequence (or nearly in sequence), the corresponding entries of the ILM table 425 will be contiguous (or nearly contiguous). Note that it is possible that two labels in a stack may be out of sequence (e.g., L1, L2, L4, L5), in which case the above-described read operation would fetch an ILM entry that is not needed (e.g., the entry corresponding to label L3). However, should such an ILM entry be fetched, it can simply be discarded. The reader is also reminded that the ILM table 425 may be stored in a memory external to the processing system executing the label handling agent 415 (e.g., the system memory 220, as shown in FIG. 4) or, alternatively, the ILM table 425 may be stored in an on-chip memory of the processing system (e.g., the on-chip memory subsystem 530, as shown in FIG. 5B).

Those of ordinary skill in the art will appreciate that, were the labels of a label stack out of sequence (e.g., L1, L500, L1000) and, hence, their corresponding ILM entries noncontiguous, multiple read instructions would need to be issued to fetch all of the needed entries from the ILM table. For example, the following read instructions may be needed to fetch three non-sequential labels:

memory_read (base_address, offset A, 1)

memory_read (base_address, offset B, 1)

memory_read (base_address, offset C, 1), where the "NoOfEntries" variable is set equal to one (1) in each read instruction. Thus, through appropriate allocation of labels—e.g., according to the method 600 of label allocation described above, or other suitable label allocation scheme—the need to issue multiple read instructions, as shown above, is reduced or eliminated. Note that, should the ILM table 425 be realized with a hash data structure, a similar result can be achieved because the ILM entries being sought will be in the same primary basket, enabling a prescribed number (e.g., the number "M") of the entries to be read in a single read instruction.

The read entries may then be stored in the ILM cache 590, as set forth in block 725. As noted above, the ILM cache 590 may be located in an on-chip memory subsystem of the processing device (see FIG. 5A) executing the label handling agent 415, or the ILM cache 590 may be located in the memory associated with a particular processing engine (see FIG. 5B) that is executing the label handling agent. The number "M" of labels that are read from the ILM table (at block 720) will be a function of the size of the ILM cache 590. Those of ordinary skill in the art will, however, appreciate that the particular memory (whether or not referred to as a cache) in which the "M" number of read ILM entries is stored is not limited to the embodiments shown in FIGS. 5A and 5B. Rather, these ILM entries may be stored in any memory capable of holding a copy of this data, such that the processing system executing the label handling agent can access the information needed to process a label stack with a minimum number of memory accesses to the ILM table (e.g., one access).

Referring to block 730, the action associated with the top label is performed. Typically, although not necessarily, the action associated with each label in the label stack will be a POP operation. As set forth in block 735, the ILM entry for the next label in the stack is accessed in the ILM cache 590, and the action (e.g., POP) associated with this next label is then performed, which is set forth in block 740. Because the ILM entry for the next label is stored in the ILM cache 590, a memory access to the ILM table 425 is unnecessary. With reference to block 745, if there are other labels in the stack which have corresponding ILM entries stored in the ILM cache 590, these labels are processed in a similar manner (see blocks 735, 740).

It is possible, due to the limitations of the ILM cache 590, that the number "M" of ILM entries read during the read operation (see block 720) will be less than the number of labels in the received packet's label stack. Should this occur, one or more additional read operations may need to be carried out. Thus, referring to block 750, if there are more labels in the label stack, another read operation is performed to read the next "M" number of entries from the ILM table 425, which is set forth in block 755. These "M" number of entries may then be stored in the ILM cache 590, as set forth in block 760, and the above-described process (see blocks 735 through 750) repeated until all labels in the stack have been processed.

Referring again to block 750, if all labels in the packet's label stack have been processed, the packet may be disposed of (e.g., forwarded on to another network), as set forth in block 790. Also, referring back to block 715, if the received packet includes a single label, the entry corresponding to this label can be read from the ILM table 425, as set forth in block 765. The action associated with the label (e.g., POP) can then be performed—see block 770—and the packet disposed of, as set forth in block 790.

Embodiments of a method 600 for allocating MPLS labels and embodiments of a method 700 for handling MPLS labels—as well as embodiments of an edge node 400 and processing devices 500 upon which the label handling scheme can be implemented—having been herein described, those of ordinary skill in the art will appreciated the advantages of the disclosed embodiments. A label stack may be processed at an edge node in an MPLS network with a minimum number of memory accesses to the ILM table. By reducing the number of memory accesses at the ILM table, a label stack—such label stacks routinely occurring in MPLS networks due to nested tunneling, as described above—can be processed with minimal latency, which increases throughput and efficiency at the edge nodes.

The foregoing detailed description and accompanying drawings are only illustrative and not restrictive. They have been provided primarily for a clear and comprehensive understanding of the disclosed embodiments and no unnecessary limitations are to be understood therefrom. Numerous additions, deletions, and modifications to the embodiments described herein, as well as alternative arrangements, may be devised by those skilled in the art without departing from the spirit of the disclosed embodiments and the scope of the appended claims.

What is claimed is:

1. A method comprising:
accessing a label stack of a received packet, the label stack including a plurality of multiprotocol label switching (MPLS) labels;
reading from an incoming label mapping (ILM) table stored in a first memory an entry associated with a top MPLS label in the label stack and a number of other entries;
storing the number of other entries read from the ILM table in a second memory.

2. The method of claim 1, further comprising performing an action associated with the top MPLS label.

3. The method of claim 2, further comprising:
accessing one of the number of other ILM entries stored in the second memory, the one ILM entry associated with a next MPLS label in the label stack; and
performing an action associated with the next MPLS label.

4. The method of claim 1, further comprising:
reading from the ILM table stored in the first memory a number of additional entries; and
storing in the second memory the additional number of ILM entries read from the first memory.

5. The method of claim 1, wherein the plurality of MPLS labels of the label stack are in sequence.

6. The method of claim 1, wherein the plurality of MPLS labels of the label stack are out of sequence.

7. The method of claim 6, wherein the ILM table comprises a hash table.

8. The method of claim 1, wherein the first memory comprises an external memory and the second memory comprises an on-chip memory.

9. The method of claim 1, wherein the first memory comprises part of an on-chip memory subsystem coupled with a processing engine, and wherein the second memory comprises an on-chip memory associated with the processing engine.

10. A device comprising:
a processing system; and
an on-chip memory coupled with the processing system;
wherein the processing system is programmed to perform operations including
accessing a label stack of a received packet, the label stack including a plurality of multiprotocol label switching (MPLS) labels;
reading from an incoming label mapping (ILM) table stored in a second memory an entry associated with a top MPLS label in the label stack and a number of other entries;

storing the number of other entries read from the ILM table in the on-chip memory.

11. The device of claim 10, wherein the processing system is programmed to perform operations further comprising performing an action associated with the top MPLS label.

12. The device of claim 11, wherein the processing system is programmed to perform operations further comprising:
accessing one of the number of other ILM entries stored in the on-chip memory, the one ILM entry associated with a next MPLS label in the label stack; and
performing an action associated with the next MPLS label.

13. The device of claim 10, wherein the processing system is programmed to perform operations further comprising:
reading from the ILM table stored in the second memory a number of additional entries; and
storing in the on-chip memory the additional number of ILM entries read from the second memory.

14. The device of claim 10, wherein the plurality of MPLS labels of the label stack are in sequence.

15. The device of claim 10, wherein the plurality of MPLS labels of the label stack are out of sequence.

16. The device of claim 15, wherein the ILM table comprises a hash table.

17. The device of claim 10, wherein the second memory comprises another on-chip memory coupled with the processing system.

18. The device of claim 10, wherein the second memory comprises an external memory.

19. The device of claim 10, wherein the processing system comprises one of a number of processing engines.

20. The device of claim 19, wherein the on-chip memory comprises part of the one processing engine.

21. The device of claim 19, wherein the on-chip memory comprises a memory subsystem coupled with the number of processing engines.

22. An apparatus comprising:
a memory; and
a processing device coupled with the memory, the processing device including a processing system and an on-chip memory coupled the processing system;
wherein the processing system is programmed to perform operations including
accessing a label stack of a received packet, the label stack including a plurality of multiprotocol label switching (MPLS) labels;
reading from an incoming label mapping (ILM) table stored in the memory an entry associated with a top MPLS label in the label stack and a number of other entries;
storing the number of other entries read from the ILM table in the on-chip memory.

23. The apparatus of claim 22, wherein the processing system is programmed to perform operations further comprising performing an action associated with the top MPLS label.

24. The apparatus of claim 23, wherein the processing system is programmed to perform operations further comprising:
accessing one of the number of other ILM entries stored in the on-chip memory, the one ILM entry associated with a next MPLS label in the label stack; and
performing an action associated with the next MPLS label.

25. The apparatus of claim 22, wherein the processing system is programmed to perform operations further comprising:
reading from the ILM table stored in the memory a number of additional entries; and
storing in the on-chip memory the additional number of ILM entries read from the memory.

26. The apparatus of claim 22, wherein the plurality of MPLS labels of the label stack are in sequence.

27. The apparatus of claim 22, wherein the plurality of MPLS labels of the label stack are out of sequence.

28. The apparatus of claim 27, wherein the ILM table comprises a hash table.

29. The apparatus of claim 22, wherein the processing system comprises one of a number of processing engines.

30. The apparatus of claim 29, wherein the on-chip memory comprises part of the one processing engine.

31. The apparatus of claim 29, wherein the on-chip memory comprises a memory subsystem coupled with the number of processing engines.

32. An article of manufacture comprising:
a machine accessible medium providing content that, when accessed by a machine,
causes the machine to
access a label stack of a received packet, the label stack including a plurality of multiprotocol label switching (MPLS) labels;
read from an incoming label mapping (ILM) table stored in a first memory an entry associated with a top MPLS label in the label stack and a number of other entries;
store the number of other entries read from the ILM table in a second memory.

33. The article of manufacture of claim 32, wherein the content, when accessed, further causes the machine to perform an action associated with the top MPLS label.

34. The article of manufacture of claim 33, wherein the content, when accessed, further causes the machine to:
access one of the number of other ILM entries stored in the second memory, the one ILM entry associated with a next MPLS label in the label stack; and
perform an action associated with the next MPLS label.

35. The article of manufacture of claim 32, wherein the content, when accessed, further causes the machine to:
read from the ILM table stored in the first memory a number of additional entries; and
store in the second memory the additional number of ILM entries read from the first memory.

36. The article of manufacture of claim 32, wherein the plurality of MPLS labels of the label stack are in sequence.

37. The article of manufacture of claim 32, wherein the plurality of MPLS labels of the label stack are out of sequence.

38. The article of manufacture of claim 37, wherein the ILM table comprises a hash table.

39. The article of manufacture of claim 32, wherein the first memory comprises an external memory and the second memory comprises an on-chip memory.

40. The article of manufacture of claim 32, wherein the first memory comprises part of an on-chip memory subsystem coupled with a processing engine, and wherein the second memory comprises an on-chip memory associated with the processing engine.

41. A system comprising:
a system memory coupled with a bus;
a program memory coupled with the bus, the program memory to store a set of instructions; and
a processing device coupled with the bus, the processing device including a processing system and an on-chip memory coupled the processing system;

wherein the processing system, when executing the set of instructions, performs operations including accessing a label stack of a received packet, the label stack including a plurality of multiprotocol label switching (MPLS) labels;

reading from an incoming label mapping (ILM) table stored in the system memory an entry associated with a top MPLS label in the label stack and a number of other entries;

storing the number of other entries read from the ILM table in the on-chip memory.

42. The system of claim 41, wherein the processing system, when executing the set of instructions, performs operations further comprising performing an action associated with the top MPLS label.

43. The system of claim 42, wherein the processing system, when executing the set of instructions, performs operations further comprising:

accessing one of the number of other ILM entries stored in the on-chip memory, the one ILM entry associated with a next MPLS label in the label stack; and performing an action associated with the next MPLS label.

44. The system of claim 41, wherein the processing system, when executing the set of instructions, performs operations further comprising:

reading from the ILM table stored in the system memory a number of additional entries; and storing in the on-chip memory the additional number of ILM entries read from the memory.

45. The system of claim 41, wherein the plurality of MPLS labels of the label stack are in sequence.

46. The system of claim 41, wherein the plurality of MPLS labels of the label stack are out of sequence.

47. The system of claim 46, wherein the ILM table comprises a hash table.

48. The system of claim 41, wherein the program memory comprises a read only memory (ROM).

* * * * *